United States Patent [19]

Kawabata

[11] 4,327,772

[45] May 4, 1982

[54] VALVE DEVICE FOR CONTROLLING FLOW OF FLUID

[75] Inventor: Yasuhiro Kawabata, Anjo, Japan

[73] Assignee: Aisin Seiki Kabushiki Kaisha, Kariya, Japan

[21] Appl. No.: 123,046

[22] Filed: Feb. 20, 1980

[30] Foreign Application Priority Data

Feb. 23, 1979 [JP] Japan .................................. 54-21202

[51] Int. Cl.$^3$ ............................................. F16K 11/07
[52] U.S. Cl. ................................ 137/625.48; 60/289; 137/625.3
[58] Field of Search ..................... 60/289; 137/625.48, 137/625.64, 625.3

[56] References Cited

U.S. PATENT DOCUMENTS

| | | | |
|---|---|---|---|
| 3,038,500 | 6/1962 | Lansky et al. | 137/596.16 X |
| 3,777,482 | 12/1973 | Canale et al. | 137/625.64 X |
| 4,216,938 | 8/1980 | Inada et al. | 251/139 X |

Primary Examiner—Gerald A. Michalsky
Attorney, Agent, or Firm—Finnegan, Henderson, Farabow, Garrett & Dunner

[57] ABSTRACT

A valve device for controlling the flow of fluid including a body portion having an inlet port for receiving a fluid under pressure, an outlet port and a relief port; a slidable piston valve positioned within the body and including a first valve portion for controlling the outlet port and a second valve portion for controlling the relief port; first and second chambers defined within the body by the piston valve and a passage for transmitting the fluid from the inlet port to the first chamber. A check valve and an orifice are positioned in the passage for proportionally reducing the fluid under pressure transmitted to the first chamber by the passage. A solenoid valve assembly is actuated in proportion to electric current supplied thereto for transmitting the fluid from the inlet port through another passage to the second chamber in proportion to the magnitude of the electric current.

6 Claims, 1 Drawing Figure

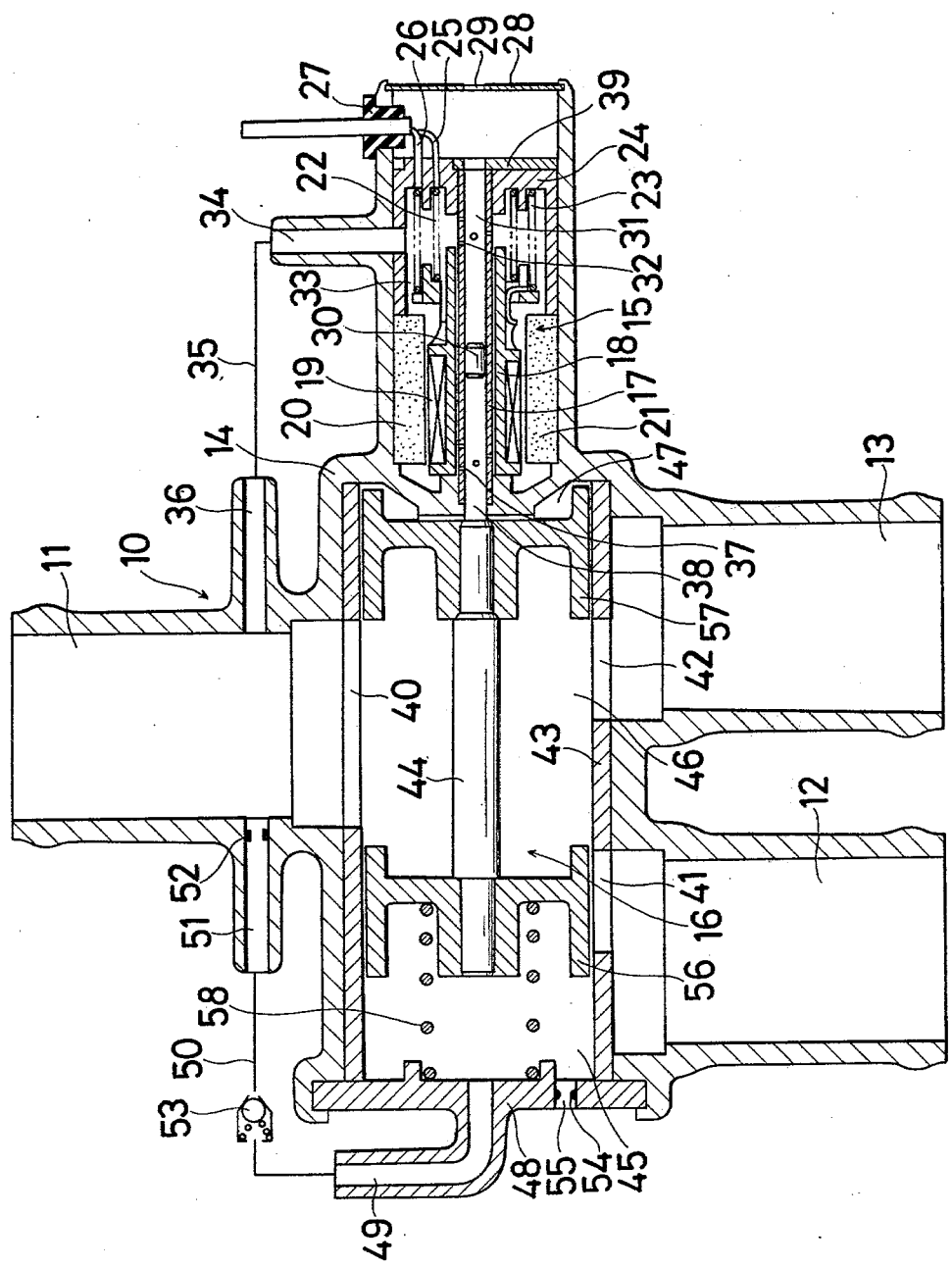

VALVE DEVICE FOR CONTROLLING FLOW OF FLUID

FIELD OF INVENTION

The present invention relates to valve devices and more particularly to solenoid-actuated valve devices for controlling the flow of fluid in proportion to an electric current supplied to the solenoid.

DESCRIPTION OF THE PRIOR ART

A conventional solenoid-actuated valve device comprises a movable core which is moved in response to an electric current signal supplied to a solenoid coil to thereby control the flow of fluid between inlet and outlet ports in proportion to the electric current signal. In such prior devices, the movable core of the solenoid, per se, acts as a valve member and thus it is required that the stroke of the movable core be sufficiently designed to completely assure the proportional controlling of the flow of fluid. As a result, the solenoid valve, per se, has to be large-sized and the weight of the movable part is correspondingly increased. Thus, the valve device is expensive to manufacture, and its anti-vibration efficiency and quick response of operation are adversely affected.

Accordingly, it is an object of the present invention to provide a new and improved solenoid-driven valve device for controlling the flow of fluid, the solenoid being reduced in size from prior art devices.

It is another object of the present invention to provide a new and improved valve device for controlling the flow of fluid which controls the desired flow of fluid in proportion to electric current supplied thereto.

Additional objects and advantages of the invention will be set forth in part in the description which follows, and in part will be obvious from the description, or may be learned by practice, of the invention. The objects and advantages of the invention may be realized and attained by means of the instrumentalities and combinations particularly pointed out in the appended claims.

SUMMARY OF THE INVENTION

In accordance with the purposes of the invention, as embodied and broadly described herein, the valve device of the invention comprises a body portion having a inlet port, an outlet port, and a relief port; a slidable piston valve positioned within the body and including a first valve portion for controlling the outlet port and a second valve portion for controlling the inlet port; first and second chambers defined within the body by the piston valve; means for transmitting fluid from the inlet port to the first chamber, the pressure of the fluid within the first chamber urging the piston valve in one direction; means for proportionally reducing the amount of fluid transmitted to the first chamber by the transmitting means; and solenoid valve assembly means actuated in proportion to electric current supplied thereto for transmitting the fluid from the inlet port to the second chamber in proportion to the magnitude of the electric current, the fluid in the second chamber urging the piston valve in the other direction.

Preferably, the transmitting means includes a passage in fluid communication with the inlet port and the first chamber, and the reducing means includes a check valve and an orifice positioned within the passage. It is also preferred that the solenoid valve assembly means includes a hollow member secured within the body, a movable bobbin slidably positioned on the hollow member, a solenoid coil wound on the bobbin, and a pair of permanent magnets disposed within the body on opposite sides of the bobbin for moving the bobbin on the hollow member in response to an electric current in the coil. Preferably also, the solenoid valve assembly means includes a third chamber in fluid communication with the inlet port and defined by the body and the bobbin, and an isolation member fixed in the hollow member for dividing the space within the hollow member into a left inside portion and a right inside portion, the right inside portion being exposed to atmospheric pressure when the bobbin is biased toward the piston valve, and the left inside portion being in constant fluid communication with the second chamber. The hollow member preferably includes left side openings therein for controlling fluid communication between the third chamber and the left inside portion in response to movement of the bobbin against the bias, and right side openings for controlling fluid communication between the third chamber and the right inside portion in response to movement of the bobbin against the bias.

BRIEF DESCRIPTION OF DRAWING:

The accompanying drawing, which is incorporated in and constitutes a part of this specification, illustrates one embodiment of the invention and, together with the description, serves to explain the principles of the invention.

The single FIGURE is a sectional view of a valve device for controlling the flow of fluid according to the present invention.

DETAILED DESCRIPTION OF THE INVENTION

Reference will now be made in detail to the present preferred embodiment of the invention, an example of which is illustrated in the accompanying drawing. Referring to the figure, a valve device 10 for controlling the flow of fluid has a body 14 which in turn has an inlet port 11, an outlet port 12, and a relief port 13. A piston valve assembly 16 is positioned within the body 14.

The piston valve assembly 16 has an annnular member 43 which is secured within the body 14 and has openings 40, 41 and 42, and a piston valve 44 which is slidably received within the annular member 43. A first chamber 45 and a second chamber 47 are defined by the arrangement of the piston valve 44. An internal chamber 46 is also defined by the piston valve 44.

In accordance with the invention the valve device includes means for transmitting the fluid from the inlet port to the first chamber, the pressure of the fluid in the first chamber urging the piston valve in one direction. As here embodied, the transmitting means includes a port 49 provided in a cover 48, a pipe 50 and a port 51 in the inlet port 11.

In accordance with the invention, the valve device also includes means for proportionally reducing the fluid under pressure transmitted to the first chamber by the first means. As here embodied, the reducing means include an orifice 52 positioned within the port 51, and a check valve 53 arranged within the pipe 50.

The cover 48 has an atmospheric port 55 including an orifice 54 therein. The chamber 46 is in constant fluid communication with the inlet port 11 by means of the opening 40, and the chamber 47 is in constant fluid communication with the left inside portion 38 of the hollow member 17.

The piston valve 44 comprises a valve portion 56 which controls the opening 41 leading to the outlet port 12, and a valve portion 57 which controls the opening 42 leading to the relief port 13. The piston valve 44 is normally maintained in its illustrated position by means of a spring 58 disposed within the chamber 45. The effective areas of the valve portions 56 and 57 which are exposed to the fluid within the chamber 46 are designed to be equal whereby the piston valve 44 receives no urging force due to the fluid within the chamber 46. Thus, the piston valve 44 is not urged by the fluid within the chamber 46 into either direction.

In accordance with the invention the valve device includes solenoid valve assembly means actuated in proportion to electric current supplied thereto for transmitting fluid from the inlet port to the second chamber in proportion to the magnitude of the electric current, the pressure of the fluid within the second chamber urging the piston valve in the other direction. As here embodied, the solenoid valve assembly means includes a solenoid valve assembly 15 comprising a hollow member 17 secured within the body 14, a movable bobbin 18 slidably positioned on the hollow member 17, a solenoid coil 19 wound on the bobbin 18 and a pair of permanent magnets 20 and 21 positioned on opposite sides of the bobbin 18. One end of the coil 19 is connected to an inside spring 22 while the other end of the coil 19 is connected to an outside spring 23. The springs 22 and 23 are co-axially supported by means of a retainer 24 and extend through the retainer 24 to a pair of lead wires 25 and 26. The wires 25 and 26 are supported by a supporting member 27 which is fitted in the body 14. The wires 25 and 26 are electrically connected to a computer (not shown).

The other ends of the springs 22 and 23 are engaged with a flange of the bobbin 18. The bobbin 18 is normally biased by the springs 22 and 23 into its illustrated position. In that position a chamber 33 is exposed to atmospheric pressure through a plurality of openings 32 provided in the hollow member 17, a right inside portion 31 within the hollow member 17 and an opening 29 provided in a cover 28. The right inside portion 31 is defined by an isolation member 30 fixedly mounted within the hollow member 17.

The chamber 33 receives the fluid from the inlet port 11 through a port 34, a pipe 35 and a port 36. The fluid transmitted to the chamber 33 from the inlet port 11 is supplied to a left inside portion 38 of the hollow member 17 when the bobbin 18 is moved to the right against springs 22 and 23. This movement of bobbin 18 thereby successively closes the openings 32 and successively opens further openings 37 provided on the hollow member 17, the openings 37 being manually closed by the bobbin under the bias of the openings 22 and 23. The bobbin 18 is moved against the bias of springs 22 and 23 upon energization of solenoid coil 19.

More particularly, when electric current flows through the coil 19, a magnetic circuit is formed including bobbin 18, body 14 and retainer 24. The arrangement of permanent magnets 20 and 21 with respect to the bobbin results in generation of a magnetic force causing the bobbin 18 to move to the right. Thus, introduction of atmospheric pressure into the chamber 33 is reduced, and the fluid transmitted to the chamber 33 from the inlet port 11 is further transmitted to the left inside portion 38 in proportion to the magnitude of movement of the bobbin 18. Numeral 39 designates a holder for the retainer 24 and the hollow member 17.

In the above valve device 10, the solenoid valve assembly 15 may be responsive to detected signals of a conventional $O_2$ sensor arranged within an exhaust manifold of a vehicle and fed to a computer. The computer in turn controls the current flow to the solenoid. The inlet port 11 may be connected to an air pump and the outlet port 12 may be connected to the exhaust manifold. Thus, the valve device 10 may be applied within an emission control system of vehicle to thereby reduce HC, CO and the like within the exhaust gas.

In operation, the various parts of the valve device 10 are normally maintained in their illustrated positions. In these positions, the fluid under pressure transmitted to the inlet port 11 from the air pump will be released through the relief port 13.

When the solenoid coil 19 is energized, the chamber 47 receives the fluid under pressure from the air pump in proportion to the movement of the bobbin 18 mentioned above. The pressure of the fluid transmitted to the chamber 45 from the air pump is controlled by means of the arrangement of orifice 52 and check valve 53 to be proportionally reduced. Furthermore, the pressure of the fluid within the chamber 45 is proportionally reduced by orifice 54 of port 55. Thus, when the pressure of the fluid within the chamber 47 exceeds the combination of the pressure of the fluid within the chamber 45 and the biasing force of the spring 58, the piston valve 44 is moved to the left in response to the difference in pressure between the fluids within chambers 45 and 47. This movement of piston valve 44 causes the valve portion 56 to correspondingly open the opening 41, while the valve portion 57 correspondingly closes or throttles the opening 42. Therefore, the output flow of fluid at the outlet port 12 will be maintained in proportion to the electric current applied to the solenoid valve assembly 15.

It will be apparent to those skilled in the art that various modifications and variations could be made in the valve device of the invention without departing from the scope and spirit of the invention.

What is claimed is:

1. A valve device for controlling the flow of fluid comprising:
   a body portion having an inlet port for receiving a fluid under pressure, an outlet port and a relief port;
   a slidable piston valve positioned within said body and including a first valve portion for controlling said outlet port and a second valve portion for controlling said relief port;
   first and second chambers defined within said body by said piston valve;
   means for transmitting the fluid from said inlet port to said first chamber including a passage in fluid communication with said inlet port and said first chamber, the pressure of the fluid within said first chamber urging the piston valve into one direction;
   means for reducing the fluid pressure being transmitted to said first chamber by said transmitting means, including an orifice and a check valve positioned in said passage; and
   a solenoid valve assembly means actuated in proportion to electric current supplied thereto for transmitting the fluid from said inlet port to said second chamber in proportion to the magnitude of said electric current, the pressure of said fluid within said second chamber urging the piston valve into the other direction, said solenoid valve assembly means including a hollow member secured within said body portion, a movable bobbin slidably positioned on the hollow member, a solenoid coil wound on the bobbin, and a pair of permanent magnets disposed within the body on opposite sides of said bobbin for moving said bobbin on said hollow member in response to an electric current in said coil, said second chamber being connected to said inlet port and exposed to atmospheric pressure.

2. The valve device according to claim 1 wherein said solenoid valve assembly means also includes means for biasing said bobbin toward said piston valve.

3. A valve device according to claim 2 wherein said solenoid valve assembly means also includes a third chamber in fluid communication with said inlet port and defined by said body and said bobbin.

4. A valve device according to claim 3 wherein said solenoid valve assembly means also includes an isolation member fixed in said hollow member for dividing the space within said hollow member into a left inside portion and a right inside portion, said right inside portion being exposed to atmospheric pressure when said bobbin is biased toward said piston valve and said left inside portion being in constant fluid communication with said second chamber.

5. A valve device according to claim 5 wherein said hollow member includes left side openings therein for controlling fluid communication between said third chamber and said left inside portion in response to movement of said bobbin against said bias.

6. A valve device according to claim 5 wherein said hollow member includes right side openings therein for controlling fluid communication between said third chamber and said right inside portion in response to movement of said bobbin against said bias.

* * * * *